(12) United States Patent
Heidari et al.

(10) Patent No.: US 9,332,554 B1
(45) Date of Patent: May 3, 2016

(54) WIRELESS HOME NETWORK SUPPORTING DISCRETE CONCURRENT COMMUNICATION LINKS

(71) Applicant: Quantenna Communications, Inc., Fremont, CA (US)

(72) Inventors: Sam Heidari, Los Altos Hills, CA (US); Bahador Amiri, Los Gatos, CA (US)

(73) Assignee: Quantenna Communications, Inc, Fremont, CA (US)

( * ) Notice: Subject to any disclaimer, the term of this patent is extended or adjusted under 35 U.S.C. 154(b) by 161 days.

(21) Appl. No.: 14/198,957

(22) Filed: Mar. 6, 2014

Related U.S. Application Data (60) Provisional application No. 61/773,336, filed on Mar. 6, 2013.

(51) Int. Cl.
*H04W 72/08* (2009.01)
*H04B 7/04* (2006.01)
*H04W 74/08* (2009.01)

(52) U.S. Cl.
CPC ........... *H04W 72/082* (2013.01); *H04B 7/0456* (2013.01); *H04W 74/0808* (2013.01)

(58) Field of Classification Search
None
See application file for complete search history.

(56) References Cited

U.S. PATENT DOCUMENTS

| 8,358,588 | B2 | 1/2013 | Goldsmith et al. | |
|---|---|---|---|---|
| 2010/0074190 | A1* | 3/2010 | Cordeiro | H04W 48/16 370/329 |
| 2011/0116489 | A1* | 5/2011 | Grandhi | H04W 16/04 370/338 |
| 2011/0228730 | A1* | 9/2011 | Abraham | H04W 48/08 370/329 |
| 2013/0170533 | A1* | 7/2013 | Khojastepour | H04B 7/024 375/227 |

OTHER PUBLICATIONS

Unpublished Pending US Patent Application Sigurd Schelstraete, et. al. "Wireless Home Network Supporting Concurrent Links to Legacy Devices" U.S. Appl. No. 14/187,318, filed Feb. 23, 2014.

* cited by examiner

*Primary Examiner* — Diane Lo
(74) *Attorney, Agent, or Firm* — IP Creators; Charles C Cary (57) ABSTRACT

A wireless apparatus node supporting wireless communications on a wireless local area network (WLAN). The wireless apparatus node includes: a local link prober, a remote link prober, a cross-link interference estimator, and a concurrent access controller. The local link prober probes a target node for channel information characterizing a communication channel for a local link therewith. The remote link prober probes a pair of device nodes on the WLAN capable of forming a remote link for cross-channel information characterizing communication channels there between. The cross-link interference estimator estimates interference signal levels at each node of the remote link resulting from communication over the local link. The concurrent access controller is responsive to a determination of an active communication on the remote link to allow a concurrent communication on the local link when interference levels at the remote link fall below a threshold level.

2 Claims, 5 Drawing Sheets

Wireless Home Network Supporting Concurrent Communication Paths

FIG. 1

Wireless Home Network Supporting Concurrent Communication Paths

FIG. 4

FIG. 5      Processing Concurrent Discrete Links

WIRELESS HOME NETWORK SUPPORTING DISCRETE CONCURRENT COMMUNICATION LINKS

CROSS REFERENCE TO RELATED APPLICATION

This application claims the benefit of prior filed Provisional Application No. 61/773,336 filed on Mar. 6, 2013 entitled "Method and Apparatus for Establishing Orthogonal Multi-Path Transmissions on a Wireless Network" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods of concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications from a single source node to more than one target nodes at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus for a wireless home network to support concurrent discrete communication links.

In an embodiment of the invention a wireless apparatus node supporting wireless communications with associated wireless device nodes on a selected one of a plurality of orthogonal frequency division multiplexed (OFDM) communication channels of a wireless local area network (WLAN) is disclosed. The wireless apparatus node includes: a local link prober, a remote link prober, a cross-link interference estimator, and a concurrent access controller. The local link prober is configured to probe at least one target node of the associated wireless device nodes for channel information characterizing a communication channel for a local link therewith. The remote link prober is configured to probe at least one pair of device nodes on the WLAN other than the at least one target node for cross-channel information characterizing communication channels between the wireless apparatus and each node of the at least one pair of device nodes capable of forming a remote link. The cross-link interference estimator is configured to estimate interference signal levels at each node of the at least one pair of device nodes resulting from a communication over the local link. The concurrent access controller is responsive to a determination of an active communication on the remote link to allow a concurrent communication on the local link when interference levels estimated by the cross-link interference estimator at each node of the remote link fall below a threshold level; thereby increasing communication throughput on the WLAN.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for increasing the range or throughput of wireless home networks by support for concurrent communication links.

Concurrent communications in accordance with the claimed invention include discrete links supporting communications during at least partially overlapping time periods instead of sequentially as is the case with prior art Carrier Sense Multiple Access (CSMA) wireless home networks. When links are referred to in the following specification and Claims: as concurrent links, as discrete concurrent links, as operating concurrently or as supporting concurrent communications; the concurrency will be understood to refer to the at least partially overlapping time periods in which concurrent communications are supported. In other words links shall be said to be concurrent in accordance with the following Specification and Claims despite the fact that the concurrent communications links may not have the same start or stop times, provided only that they do have at least partially overlapping time periods in which concurrent communications are supported.

Unlike MU-MIMO where a single source node drives concurrent communications to two different targets, the current invention is operative with or without MU-MIMO capability, and allows the wireless home network to support concurrent communications on two or more distinct links where each link includes at minimum two nodes and the links are distinct from one another in that they do not include a common node.

Figure 1:
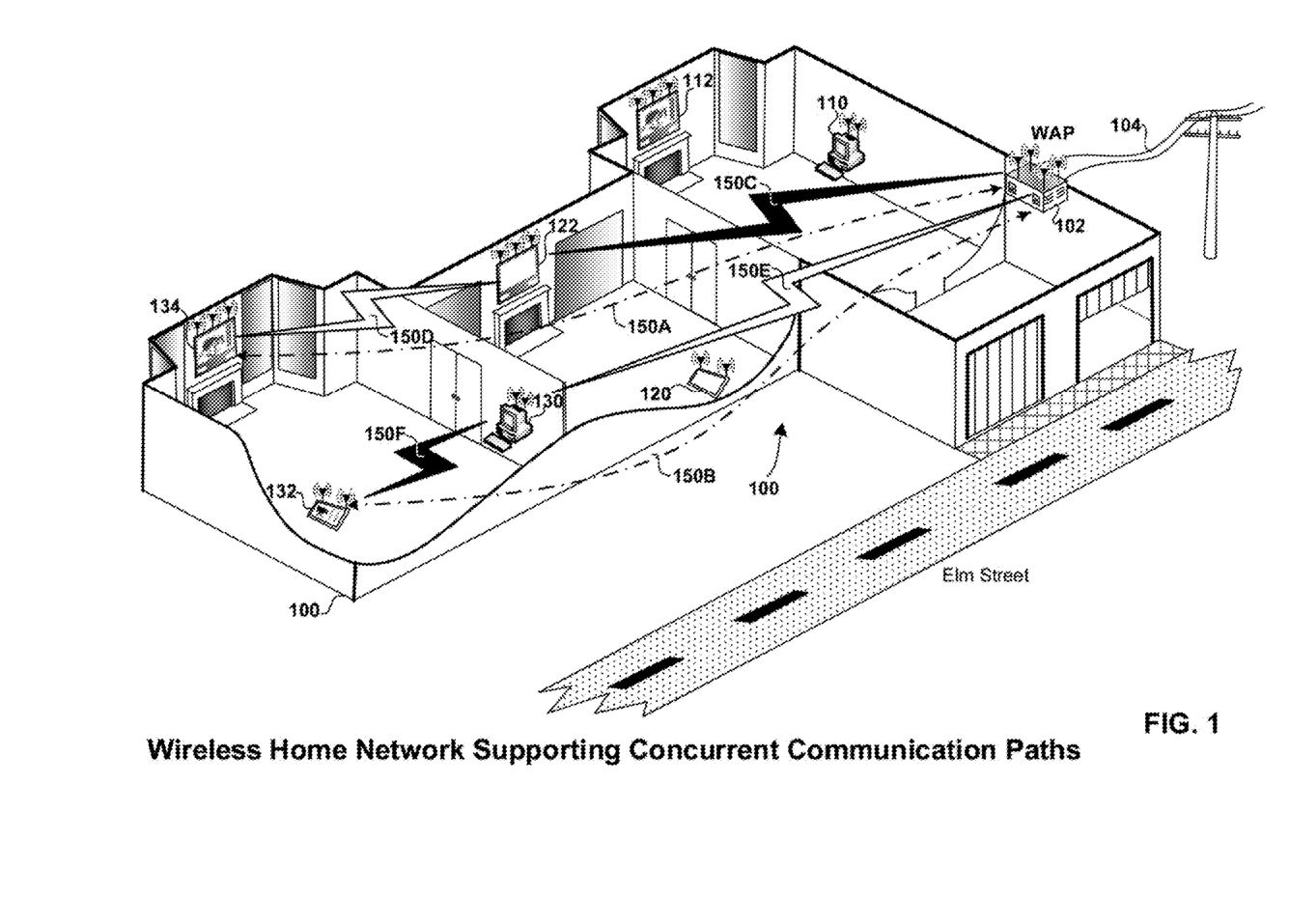
FIG. 1 is a perspective view of a residence with a wireless home network which supports discrete concurrent communication links in accordance with an embodiment of the current invention.

FIG. 1 is a perspective view of a residence with a wireless home network which supports discrete concurrent communication links in accordance with an embodiment of the current invention. The residence 100 includes a wireless access point (WAP) 102 coupled to an Internet Service Provider (ISP), not shown, via a digital subscriber line (DSL) 104. The residence includes wireless stations 110, 112, 120, 122, 130, 132, 134 operative with the WAP to form the wireless home network. In the example shown content is being delivered from the WAP to distant stations 132 and 134. Four communication paths are shown two of which are direct paths and two of which are indirect, a.k.a. single hop paths, involving an intermediate 'relay' station. Direct paths 150A and 150B deliver content from the WAP to wireless stations 134 and 132 respectively. One indirect path delivers content from the WAP to station 134 through link 150C between the WAP and station 122 and link 150D between the station 122 and the endpoint station 134. The other indirect path delivers content from the WAP to station 132 through link 150E between the WAP and station 130 and link 150F between the station 130 and the associated endpoint station 132. Instead of serially delivering content via each of the four links in accordance with the current Carrier Sense Multiple Access (CSMA) protocol supported on wireless home networks compliant with the IEEE 802.11 "a", "b", "g", "n", "ac", "ad" standards; the current invention allows non interfering links to operate concurrently. Concurrent operation as defined above in paragraph 21, and as set forth in the current invention increases network throughput and decreases single-hop latency by allowing substantial overlapping time intervals during which communications on two or more discrete links are supported, e.g. links 150C together with link 150F or perhaps link 150E together with link 150D.

Figures 2A, 2B, 2C, 2D, 2E, 2F:
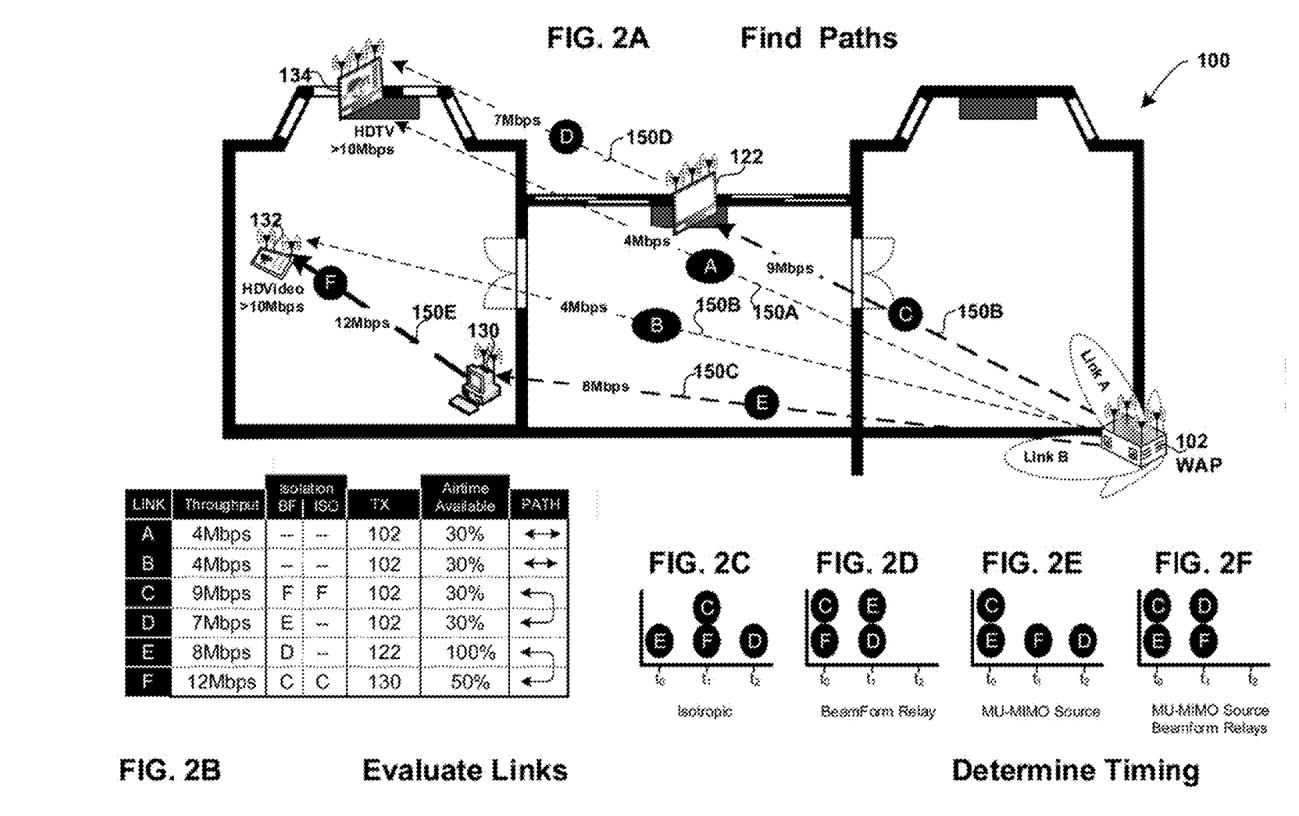
FIGS. 2A, 2B are respectively a plan view of the residence shown in FIG. 1 showing various direct and single hop communications paths to two wireless stations, and a link evaluation table showing metrics for evaluating the communication paths.
FIGS. 2C-2F are timing graphs showing the order and sequence of communications on the wireless home network.

FIGS. 2A, 2B are respectively a plan view of the residence shown in FIG. 1 showing various direct and single hop communications paths to two wireless stations, and a link evaluation table showing metrics for evaluating the communication paths.

In FIG. 2A the links associated with various communication or content delivery paths are labeled with both a reference number and an associated reference letter. The associated reference letter is the same letter as appears at the end of the reference number. This abbreviation makes for more concise table and graphs in FIG. 2B and FIGS. 2C-2F. Next to each communication path and associated link(s) shown in FIG. 2A is the associated throughput in mega bits per second (Mbps). The WAP discovers these direct and indirect communication paths for delivery of content to stations 132 and 134. The WAP identifies a direct path 150A to station 134 and an indirect path including links 150B and 150D through an intermediate relay station 122. The WAP identifies a direct path 150B to station 132 and an indirect path including links 150C and 150E through an intermediate relay station 130. Each of stations 132, 134 require throughputs above 10 Mbps along the chosen path in order to deliver HDTV content. Neither of the direct paths offers the required throughput level, making it necessary for the WAP to evaluate alternate or complementary paths for delivery of the required content.

FIG. 2B is a link evaluation table showing metrics for evaluating the communication paths. The throughput for each link is estimated using the relevant capabilities associated with each node in each link as well as the known channel between each link. The relevant capabilities of each node include: number of antennas, number of supported streams, Multiple-Input Multiple-Output (MIMO) support, beamforming, or multi-user (MU) MIMO for example. The degree of isolation of each link from other links in the network is also considered for both the beamformed case (BF) and for the isotropic case (ISO). Links using a focused signal radiation for transmission of data, a.k.a. beamformed links, are more likely to be more isolatable from one another than links for which the transmitted signal strength is isotropic. Where a path includes links into and out of a station operating as a relay node the amount of airtime available on the station for performing the relay activity is also considered, e.g. is the relaying wireless HDTV station currently delivering its own content or is it dormant. All paths are thus evaluated by the WAP singly or in combination to determine whether content delivery at the required minimum throughput can be accomplished.

FIGS. 2C-2F are timing graphs showing the order and sequence of communications on the wireless home network delivering content to wireless devices 132 and 134 over indirect paths offering a slight improvement in throughput over the direct path counterparts. The current invention decreases the latency associated with content delivery over these indirect paths by avoiding the sequential CSMA access constraint for wireless home networks when concurrent transmissions do not interfere with one another. FIG. 2C shows a representative set of link/path choices for content delivery over indirect paths to each station when the relay nodes do not support beamforming. Links C (150C) and F (150F) are shown operating concurrently on the shared communication channel of the wireless home network, due to their physical separation from one another. FIG. 2D shows a representative set of link/path choices for content delivery over indirect paths to each station when the relay nodes do support beamforming. Links C (150C) and F (150F) are shown operating concurrently on the shared communication channel of the wireless home network in a first time interval, and links E (150E) and D (150D) are shown operating concurrently in a second time interval, due to both to their physical separation from one another and the focused radiation pattern available as a result of beamforming. FIGS. 2E and 2F show additional timing options for these links in the case of a WAP which supports MU-MIMO (FIG. 2E) and in the case in which the relay supports beamforming.

Figure 3A:
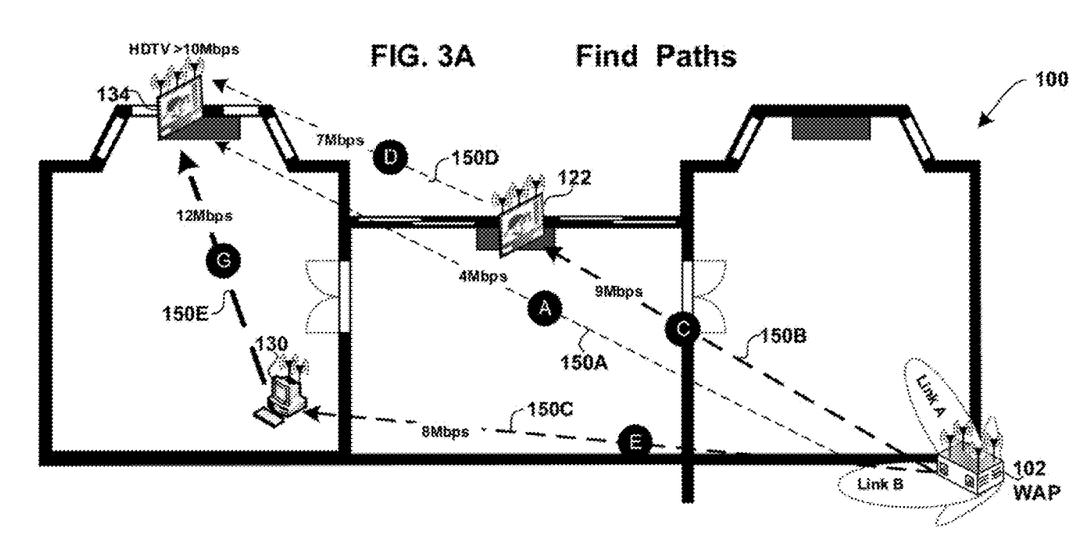
FIGS. 3A, 3B are respectively a plan view of the residence shown in FIG. 1 showing various direct and single hop communications paths to a single wireless station, and a link evaluation table showing metrics for evaluating the communication paths thereto.
Figure 3B:
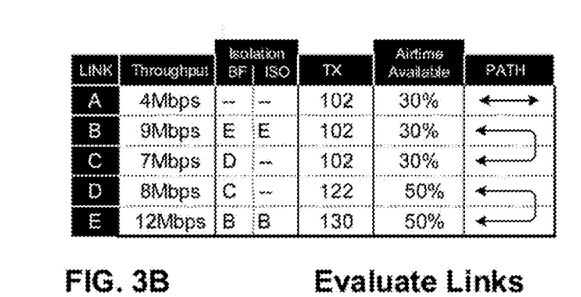

FIGS. 3A, 3B are respectively a plan view of the residence shown in FIG. 1 showing various direct and single hop communications paths to a single wireless station, and a link evaluation table showing metrics for evaluating the communication paths.

In FIG. 3A the links associated with various communication or content delivery paths are labeled with both a reference number and an associated reference letter. The associated reference letter is the same letter as appears at the end of the reference number. This abbreviation makes for more concise table and graphs in FIG. 3B and FIGS. 3C-3F. Next to each communication path and associated link(s) shown in FIG. 3A is the associated throughput in mega bits per second (Mbps). The WAP discovers these direct and indirect communication paths for delivery of content to station 134. The WAP identifies a direct path 150A to station 134 and two indirect paths. One indirect path for content delivery to station 134 includes links 150B and 150D through the intermediate station 122 operating as a relay. The other indirect path for content delivery to station 134 includes links 150E and 150G through the intermediate station 130 operating as a relay. Station 134 requires throughputs above 10 Mbps along the chosen path in order to deliver HDTV content. Neither of the direct paths offers the required throughput level, making it necessary for the WAP to evaluate alternate or complementary paths for delivery of the required content.

FIG. 3B is a link evaluation table showing metrics for evaluating the communication paths. The throughput for each link is estimated using the relevant capabilities associated with each node in each link as well as the known channel between each link. The relevant capabilities of each node include as discussed above the: number of antennas, number of supported streams, Multiple-Input Multiple-Output (MIMO) support, beamforming, or multi-user (MU) MIMO for example. The degree of isolation of each link from other links in the network is also considered for both the beamformed case (BF) and for the isotropic case (ISO). Links using a focused signal radiation for transmission of data, a.k.a. beamformed links, are more likely to be more isolatable from one another than links for which the transmitted signal strength is isotropic. Where a path includes links into and out of a station operating as a relay node, the amount of airtime available on the station for performing the relay activity is also considered, e.g. is the relaying wireless HDTV station currently delivering its own content or is it dormant. All paths are thus evaluated by the WAP singly or in combination to determine whether content delivery at the required minimum throughput can be accomplished.

Figure 3C:
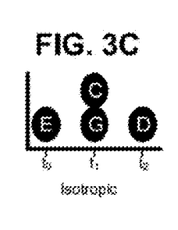
FIGS. 3C-3F are timing graphs showing the order and sequence of communications on the wireless home network.
Figure 3D:
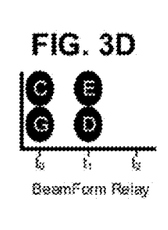
Figure 3E:
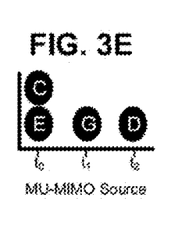
Figure 3F:
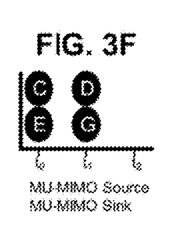

FIGS. 3C-3F are timing graphs showing the order and sequence of communications on the wireless home network delivering content to wireless device 134 over two combined indirect paths offering a significant improvement in throughput over the direct path 150A counterpart. The current invention decreases the latency associated with content delivery over these indirect paths by avoiding the sequential CSMA access constraint for wireless home networks when concurrent transmissions do not interfere with one another. FIG. 3C shows a representative set of link/path choices for content delivery over indirect paths to each station when the relay nodes do not support beamforming. Links C (150C) and G (150G) are shown operating concurrently on the shared communication channel of the wireless home network, due to their physical separation from one another. FIG. 3D shows a representative set of link/path choices for content delivery over two indirect paths to the station when the relay nodes do support beamforming. Links C (150C) and G (150G) are shown operating concurrently on the shared communication channel of the wireless home network in a first time interval, and links E (150E) and D (150D) are shown operating concurrently in a second time interval, due to both to their physical separation from one another and the focused radiation pattern available as a result of beamforming. FIGS. 3E and 3F show additional timing options for these links in the case of a WAP which supports MU-MIMO (FIG. 3E) and in the case in which the receiving endpoint station 134 supports MU-MIMO.

Figure 4:
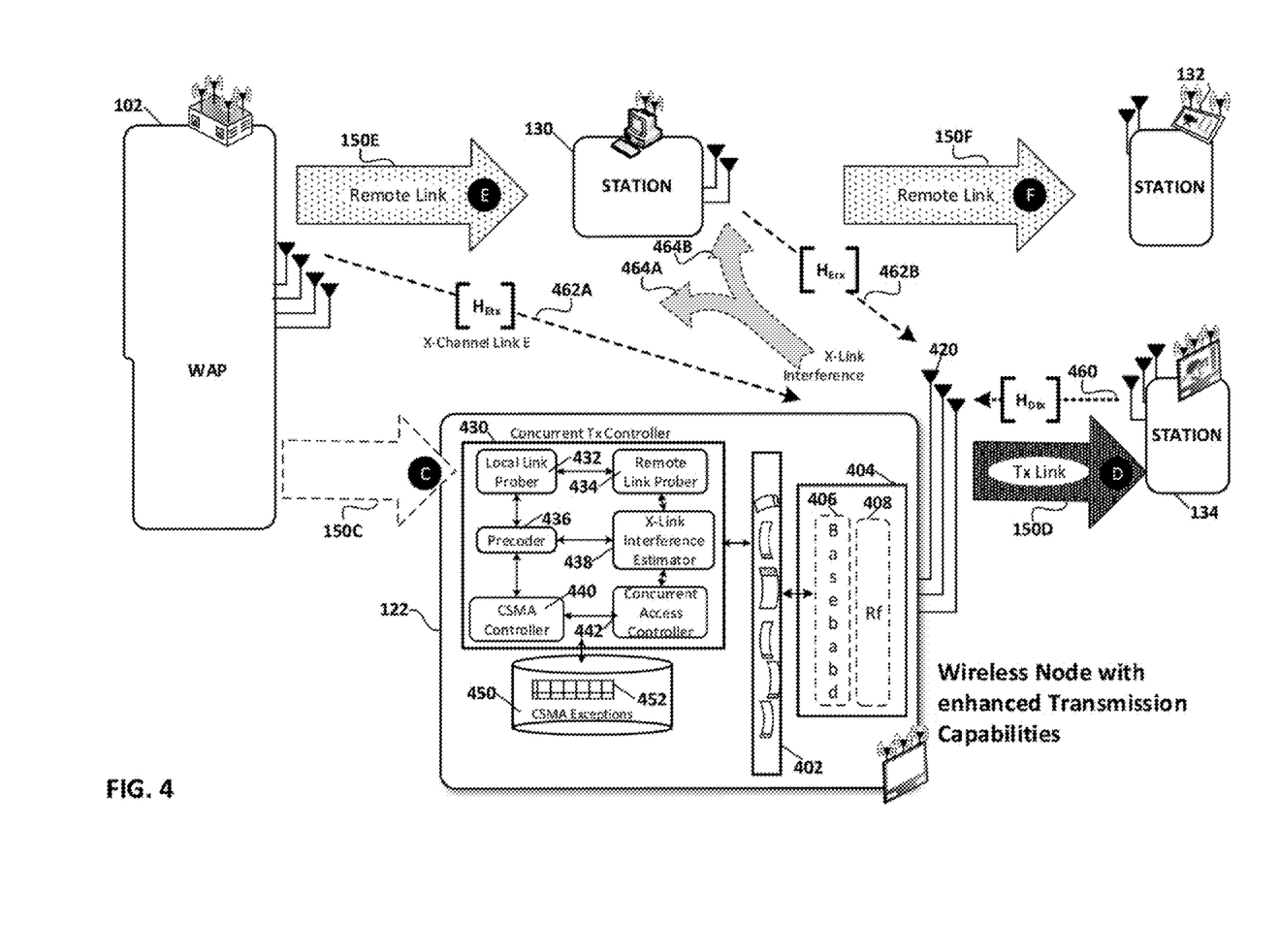
FIG. 4 is a combined system and hardware block diagram showing a representative wireless apparatus node in accordance with an embodiment of the invention.

FIG. 4 is a combined system and hardware block diagram showing a representative wireless apparatus node in accordance with an embodiment of the invention. WAP 102 is shown along with stations 122, 130, 132, and 134. Links 150C, 150D, 150E, 150F are shown. Station 122 is shown trying to establish a local link 150D to target node, station 134. In prior art wireless home networks such link could only be active when the communication medium was idle. In the current invention such is not necessarily the case. Remaining links 150E and 150F are further identified as remote links, because under the CSMA protocol they compete for airtime on the shared communication channel with the local link 150D between station 122 and station 134. The remote links do not have any wireless node in common with the local link 150D.

Station 122 includes a packet based bus coupling a concurrent transmit controller to the wireless stage 404 implementing one or more of the IEEE 802.11 "a", "b", "g", "n", "ac", "ad" standards. The wireless stage includes a baseband section 406 and a radio frequency (Rf) section 408 coupled to three antennas 420, for MIMO support. A concurrent transmit controller 430 is coupled to the wireless stage through the packet based buss 402. The concurrent transmit controller includes storage 450.

The concurrent transmit controller determines whether an exception to the CSMA access methodology implemented by the wireless network can be made during intervals when an active remote link is detected by the station. Under CSMA access methodology nodes avoid collisions with one another by transmitting only when the shared communication channel is idle, i.e. is not in use by other nodes. The concurrent transmit controller judiciously avoids this access constraint under limited conditions in which the local link will not interfere with the active remote link. The information required to make this decision can be obtained proactively or reactively as will be explained.

The concurrent transmit controller includes a local and a remote link prober 432, 434 respectively. It also includes a precoder 436, a cross-link interference estimator 438, a CSMA controller 440, and a concurrent access controller 442. The local link prober 432 is configured to probe at least one target node of the associated wireless device nodes for channel information characterizing a communication channel for a local link therewith. In FIG. 4 the target node for the local link 150D is station 134. The local link prober determines the information about the communication channel 460, a.k.a. "H" between the stations 122 and 134 using either implicit or explicit channel sounding dependent on the capabilities of station 134.

The remote link prober 434 is configured to probe remote links and their associated device nodes for cross-channel information characterizing the communication channels between the wireless apparatus and each node of the remote link. This probing may be done proactively for all remote links in the network or reactively for a single remote link which is active. The remote link prober is shown controlling the wireless stage 404 to obtain cross-channel information 462A and 462B from the nodes associated with remote link 150E, i.e. WAP 102 and station 130. This information will be used to determine whether a transmission on local link 150D will have cross link interference 464A, 464B which degrades communications on 150E below an acceptable level.

The precoder 436 is configured to determine a precode matrix "Q" for spatial mapping multiple-input multiple-output (MIMO) communications associated with the local link 150D. The cross-link interference estimator 438 is coupled to the precoder and configured to select a precode matrix generated by the precoder, which both maximizes throughput to the target node on local link together with minimizing cross-link interference levels 464A-464B at both nodes of the remote link 150E. If such a matrix exists then a CSMA exception record 452 is created and stored in storage 450 for later use in overriding a CSMA access block. Each CSMA exception record includes the local and remote link and any relevant channel and precoding information.

The Carrier Sense Multiple Access (CSMA) controller 440 is configured to determine whether there is an active remote communication link on the selected communication channel and to prevent additional communication links on the selected communication channel until an idle interval of the communication channel. The concurrent access controller 442 is responsive to an affirmative determination by the CSMA controller to override the CSMA controller and to allow a concurrent communication on the selected communication channel by the local link provided that the estimated interference signal levels resulting therefrom at each node of the active remote link fall below a threshold level.

In alternate embodiments the wireless device containing the concurrent transmit controller can be a WAP node, a station node, or a Mesh node without departing from the scope of the claimed invention. The remote links processed by the concurrent transmit controller can be part of either direct paths, or indirect paths and in the latter case can involve more than one "hop".

Figure 5:
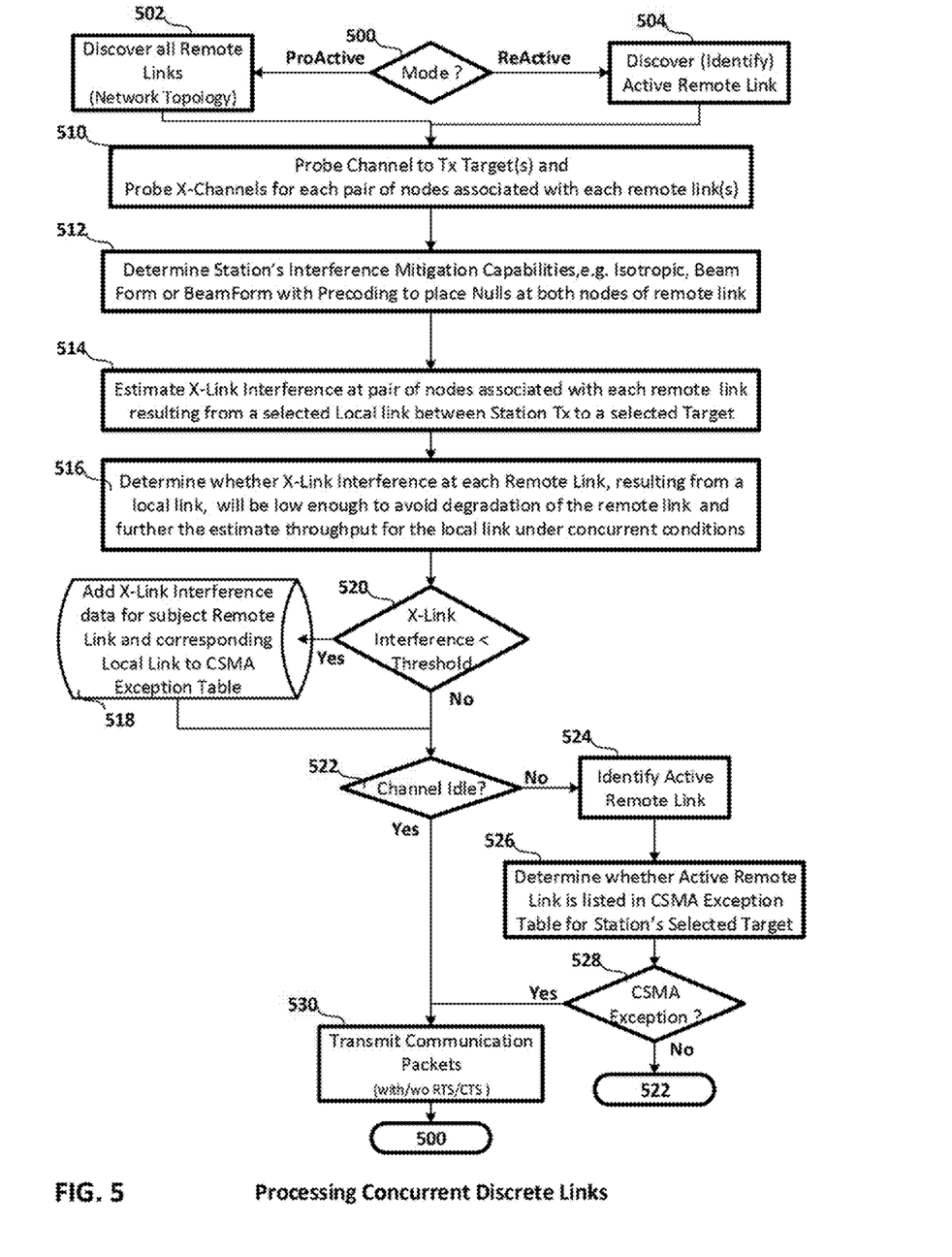
FIG. 5 is a process flow diagram of processes associated with supporting concurrent discrete communication links on the wireless home network in accordance with an embodiment of the invention.

FIG. 5 is a process flow diagram of processes associated with supporting concurrent discrete communication links on the wireless home network in accordance with an embodiment of the invention. Processing begins with decision process 500 in which the mode of operation, i.e. proactive or reactive is determined. In the reactive mode, identification of remote links and associated cross-channel interference is only determined for an active remote link and a pending local link in process 504. In the proactive mode, identification of remote links and associated cross-channel interference is determined for all remote links whether or not active for one or more local links in process 502. At the completion of either discovery process 502 or 504 control passes to process 510.

In process 510 the channel(s) to the station's local link target(s) are determined using implicit or explicit channel sounding. Also, the cross-channels for each identified pair of nodes associated with each identified remote link(s) is also determined using implicit or explicit channel sounding.

Next control is passed to process 512 in which the station's interference mitigation capabilities are determined: e.g. Isotropic transmit signal pattern, or beamforming or beamforming with precoding to place nulls at both nodes of each remote link. Next in process 514 the cross link interference from a given local link between the station and a target, is estimated at each node of the pair of nodes associated with each remote link. Then in process 516 a determination is made as to whether the cross link interference at the remote link(s), resulting from a local link, will be low enough to avoid degradation of the remote link and further allow adequate throughput for the local link under the concurrent conditions. In this process the amount of degradation of the remote link and the estimated throughput of the local link may be established.

Next in decision process 520 a determination is made as to whether the cross link interference determined in process 516 is below an acceptable level or threshold. If it is then a CSMA exception record is created and stored for later use in overriding a CSMA access block. Each CSMA exception record includes the local and remote link and any relevant channel and precoding information.

Control then passes to decision process 522 for a determination as to whether the shared communication channel is idle, i.e. if there are no active remote links. If it is then control passes to process 530 for the transmission of the communication packets associated with the local link. Alternately, if the shared communication channel is not idle, i.e. if there is an active remote link, then control passed to process 524 in which the active remote link is identified. Control then passes to process 526 in which a determination is made as to whether the active remote link is listed in the CSMA exception table for the station's selected target node. If it is, then in decision process 528 a CSMA exception is made and the CSMA access block is overridden by the transmission 530 of the local link which at least partially overlaps with, i.e. is concurrent with the transmission of the active remote link after which control returns to decision process 500. If, alternately in decision process 528 a determination is made that the active remote link is not listed in the CSMA exception table then control returns to decision process 522 until the station is no longer idle. In an alternate embodiment of the invention these concurrent transmission decision making processes can be implemented with or without CSMA without departing from the scope of the claimed invention.

The wireless apparatus node in accordance with an alternate embodiment of the current invention, is a 'dual band' device capable of supporting simultaneous communications on two different networks and using the aforesaid capabilities to offer qualified support for concurrent communications on discrete communication links within either network.

The components and processes disclosed herein may be implemented in software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless apparatus node supporting wireless communications with associated wireless device nodes on a selected one of a plurality of orthogonal frequency division multiplexed (OFDM) communication channels of a wireless local area network (WLAN); and the wireless apparatus comprising:
   a local link, prober configured to probe at least one target node of the associated wireless device nodes for channel information characterizing a communication channel for a local link therewith;
   a remote link prober configured to probe at least one pair of device nodes on the WLAN other than the at least one target node for cross-channel information characterizing communication channels between the wireless apparatus and each node of the at least one pair of device nodes capable of forming a remote link; and the remote link prober further configured to probe the at least one pair of device nodes utilizing reverse channel estimates for selected ones of the at least one pair that do not support explicit channel sounding;
   a cross-link interference estimator configured to estimate interference signal levels at each node of the at least one pair of device nodes resulting from a communication over the local link; and
   a concurrent access controller responsive to a determination of an active communication on the remote link to allow a concurrent communication on the local link when interference levels estimated by the cross-link interference estimator at each node of the remote link fall below a threshold level; thereby increasing communication throughput on the WLAN.

2. A method for operating a wireless device node supporting wireless communications with associated wireless device nodes on a selected one of a plurality of orthogonal frequency division multiplexed (OFDM) communication channels of a wireless local area network (WLAN); and the method comprising:
   probing at least one target node of the associated wireless device nodes for channel information characterizing a communication channel for a local link therewith;
   probing at least one pair of device nodes on the WLAN other than the at least one target node for cross-channel information characterizing communication channels between the wireless apparatus and each node of the at least one pair of device nodes capable of forming a remote link; and further probing the at least one pair of device nodes utilizing reverse channel estimates for selected ones of the at least one pair that do not support explicit channel sounding;
   estimating interference signal levels at each node of the at least one pair of device nodes resulting from a communication over the local link; and
   allowing concurrent discrete communication on the local ink and the remote link when interference levels from the local link as estimated in the estimating act at each node of the remote link fall below a threshold level.

* * * * *